United States Patent
Kakadiya et al.

(10) Patent No.: US 11,055,666 B2
(45) Date of Patent: Jul. 6, 2021

(54) SYSTEMS AND METHODS FOR AUTOMATION OF CORPORATE WORKFLOW PROCESSES VIA MACHINE LEARNING TECHNIQUES

(71) Applicant: The Abstract Operations Company, San Francisco, CA (US)

(72) Inventors: Bhavesh Kakadiya, San Francisco, CA (US); Hari Raghavan, Oakland, CA (US); Adam Spector, San Francisco, CA (US)

(73) Assignee: The Abstract Operations Company, San Francisco, CA (US)

( * ) Notice: Subject to any disclaimer, the term of this patent is extended or adjusted under 35 U.S.C. 154(b) by 0 days.

(21) Appl. No.: 17/093,630

(22) Filed: Nov. 9, 2020

(65) Prior Publication Data

US 2021/0056510 A1    Feb. 25, 2021

(51) Int. Cl.

| | |
|---|---|
| *G06Q 10/06* | (2012.01) |
| *G06Q 10/10* | (2012.01) |
| *G06F 16/93* | (2019.01) |
| *G06F 16/28* | (2019.01) |
| *G06N 20/00* | (2019.01) |
| *G06K 9/00* | (2006.01) |
| *G06F 3/0482* | (2013.01) |
| *G06Q 50/18* | (2012.01) |
| *G06Q 30/00* | (2012.01) |

(52) U.S. Cl.
CPC ......... *G06Q 10/103* (2013.01); *G06F 16/285* (2019.01); *G06F 16/93* (2019.01); *G06K 9/00456* (2013.01); *G06K 9/00463* (2013.01); *G06N 20/00* (2019.01); *G06Q 10/06312* (2013.01); *G06F 3/0482* (2013.01); *G06Q 10/1053* (2013.01); *G06Q 30/018* (2013.01); *G06Q 50/18* (2013.01)

(58) Field of Classification Search
CPC ......... G06F 16/30; G06Q 10/06; G06Q 10/10
USPC ....................................... 705/7.22
See application file for complete search history.

(56) References Cited

U.S. PATENT DOCUMENTS

| 10,303,771 B1 * | 5/2019 | Jezewski ................. G06F 16/30 |
| 2010/0082709 A1 * | 4/2010 | Yamamoto .............. G06F 16/93 |
| | | 707/812 |

(Continued)

*Primary Examiner* — Nga B Nguyen
(74) *Attorney, Agent, or Firm* — Cognition IP, P.C.; Edward Steakley

(57) ABSTRACT

Systems, methods and computer program products are presented for the automation of corporate process workflows that require the generation and completion of multiple documents. An Automation Platform receives a selection to initiate a workflow process that includes a sequence of one or more documents that correspond to respective document outline types for workflow completion. The Automation Platform classifies a first document according to a first document outline type in the sequence of the initiated workflow process. The Automation Platform assigns (i.e. maps) one or more named entities extracted from the first document to respective document parameters for the first document outline type and determines a schedule for automatic completion of a second document in the sequence of the initiated workflow process based in part on the first document outline type of the first document and one or more of the assigned named entities extracted from the first document.

17 Claims, 11 Drawing Sheets

(56) References Cited

U.S. PATENT DOCUMENTS

| | | | |
|---|---|---|---|
| 2014/0156567 A1* | 6/2014 | Scholtes | G06N 5/02 706/12 |
| 2014/0222928 A1* | 8/2014 | Scholtes | H04L 51/046 709/206 |
| 2017/0116189 A1* | 4/2017 | Chigusa | G06F 16/3331 |
| 2018/0143975 A1* | 5/2018 | Casal | G06F 40/58 |
| 2018/0239959 A1* | 8/2018 | Bui | G06F 40/103 |
| 2019/0026634 A1* | 1/2019 | Homeyer | G06Q 10/103 |
| 2019/0384807 A1* | 12/2019 | Dernoncourt | G06F 16/93 |
| 2020/0065857 A1* | 2/2020 | Lagi | G06F 16/9535 |
| 2020/0073882 A1* | 3/2020 | Guggilla | G06F 16/353 |
| 2020/0097717 A1* | 3/2020 | Young | G06N 3/08 |
| 2020/0097718 A1* | 3/2020 | Schafer | G06K 9/6256 |
| 2020/0111023 A1* | 4/2020 | Pondicherry Murugappan | G06N 7/005 |
| 2020/0175267 A1* | 6/2020 | Schafer | G06K 9/00463 |

* cited by examiner

SYSTEMS AND METHODS FOR AUTOMATION OF CORPORATE WORKFLOW PROCESSES VIA MACHINE LEARNING TECHNIQUES

CROSS-REFERENCE TO RELATED APPLICATIONS

This application is related to U.S. patent application Ser. No. 17/093,622 entitled "SYSTEMS AND METHODS FOR PREDICTING MAPPINGS BETWEEN NAMED ENTITIES AND PARAMETERS," filed on Nov. 9, 2020, which is hereby incorporated by reference in its entirety.

BACKGROUND

Conventional software systems may be deployed across various organizations to store and manage data vital to organizational efficiency. In many cases, conventional software systems complete the tasks traditionally performed by employees or assist those employees in completing those tasks accurately and in a timely fashion. Certain conventional software systems may be specifically tailored and designed to manage and perform specialized functions within an organization. For example, some conventional software systems may be designed to be deployed for legal tasks, while other may be designed to be deployed for human resources tasks and/or finance department tasks. In other situation, conventional software systems may be directed to monitoring security and compliance requirements.

SUMMARY

Information shared between corporate employees via various conventional software systems across different corporate function units may become inaccurate or inconsistent. As a result, important dates, tasks and compliance requirements may be unintentionally ignored or missed, resulting in inefficiencies and substantial losses to the organization, internal stakeholders, customers and/or vendors. Such conventional software systems lack a holistic customization framework and cannot provide a sense to executives of predictability of the initiation and completion of various corporate workflows. Instead, certain employees are inevitably employed to take on roles for starting, monitoring and resolving complex and numerous corporate operational tasks.

Systems, methods and computer program products are presented for an Automation Platform that provides for the automation of corporate process workflows by understanding the ingested documents. Those workflows may require the generation and completion of multiple documents. According to various embodiments, the Automation Platform receives a selection to initiate a workflow process that includes a sequence of one or more documents that correspond to respective document outline types for workflow completion. The Automation Platform receives a first document and classifies the first document according to a first document outline type present in the sequence of the initiated workflow process. The Automation Platform predicts mappings between one or more named entities extracted from the first document to respective document parameters for the first document outline type and determines a schedule for automatic completion of a second document in the sequence of the initiated workflow process based in part on the mapped named entities.

According to various embodiments, the Automation Platform implements various machine learning algorithms for classifying documents according to respective document outline types. The Automation Platform implements various machine learning algorithms for mapping text values of named entities extracted from a document(s) with defined parameters of a document outline type.

According to various embodiments, the Automation Platform displays a dashboard user interface for receiving a selection to initiate one or more workflow processes and a review user interface that provides functionality for a human end-user to input corrections for inaccurate mappings.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
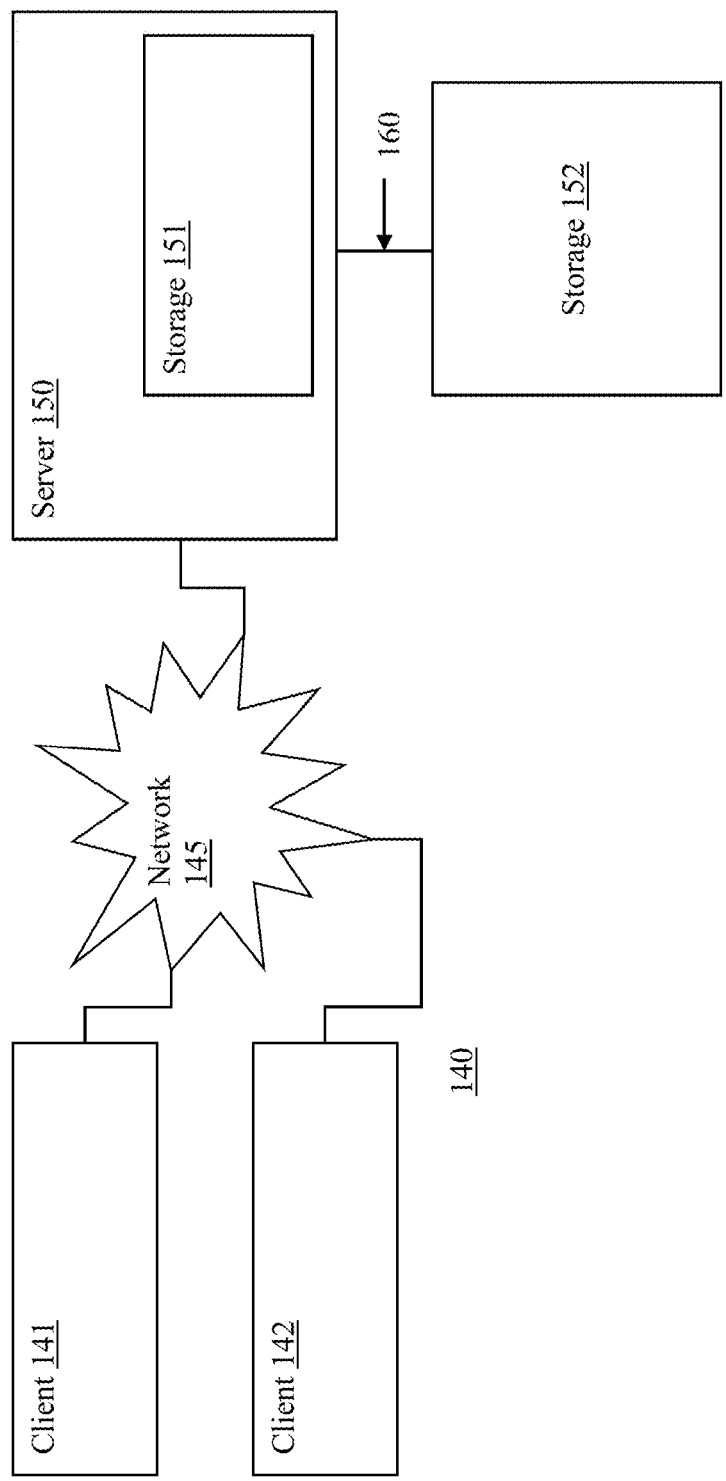
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

A diagram of exemplary network environment in which embodiments may operate is shown in FIG. 1A. In the exemplary environment 140, two clients 141, 142 are connected over a network 145 to a server 150 having local storage 151. Clients and servers in this environment may be computers. Server 150 may be configured to handle requests from clients. Server 150 may be implemented as a number of networked server devices, though it is illustrated as a single entity. Communications and transmissions between a base station and one or vehicles and between a base station and one or more control centers as described herein may be executed similarly as the client 141, 142 requests.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151.

In another embodiment, the client 141 may be a vehicle that sends vehicle sensor data used during execution of the method 200 or other method herein. This may be accomplished via communication over the network 145 between the client 141 and server 150. For example, the client may communicate a request to the server 150 to store a file with a specified file name in the storage 151. The server 150 may respond to the request and store the file with the specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
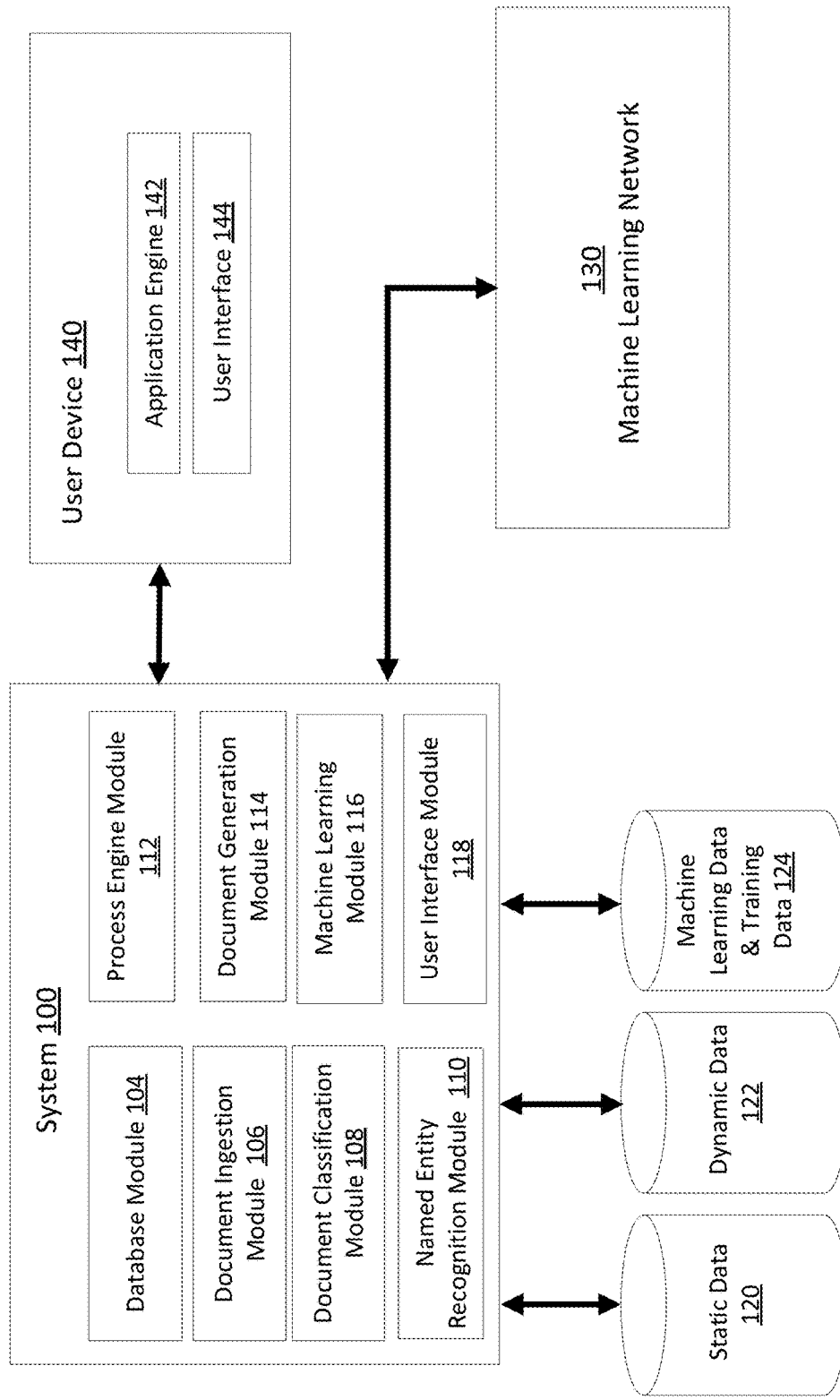
FIG. 1B is a diagram illustrating an exemplary environment in which some embodiments may operate.

FIG. 1B illustrates a block diagram of an example system 100 for an Automation Platform that includes a database module 104, a document ingestion module 106, a document classification module 108, a document entity recognition 110, a process engine module 112, a document generation module 114, a machine learning module 116 and a user interface (U.I.) module 118. The system 100 may communicate with a user device 140 to display output, via a user interface 144 generated by an application engine 142.

The database module 104 of the system 100 may perform functionality as illustrated in FIGS. 2, 3, 4, 5A, 5B, 5C, 6A and 6B.

Figure 2:
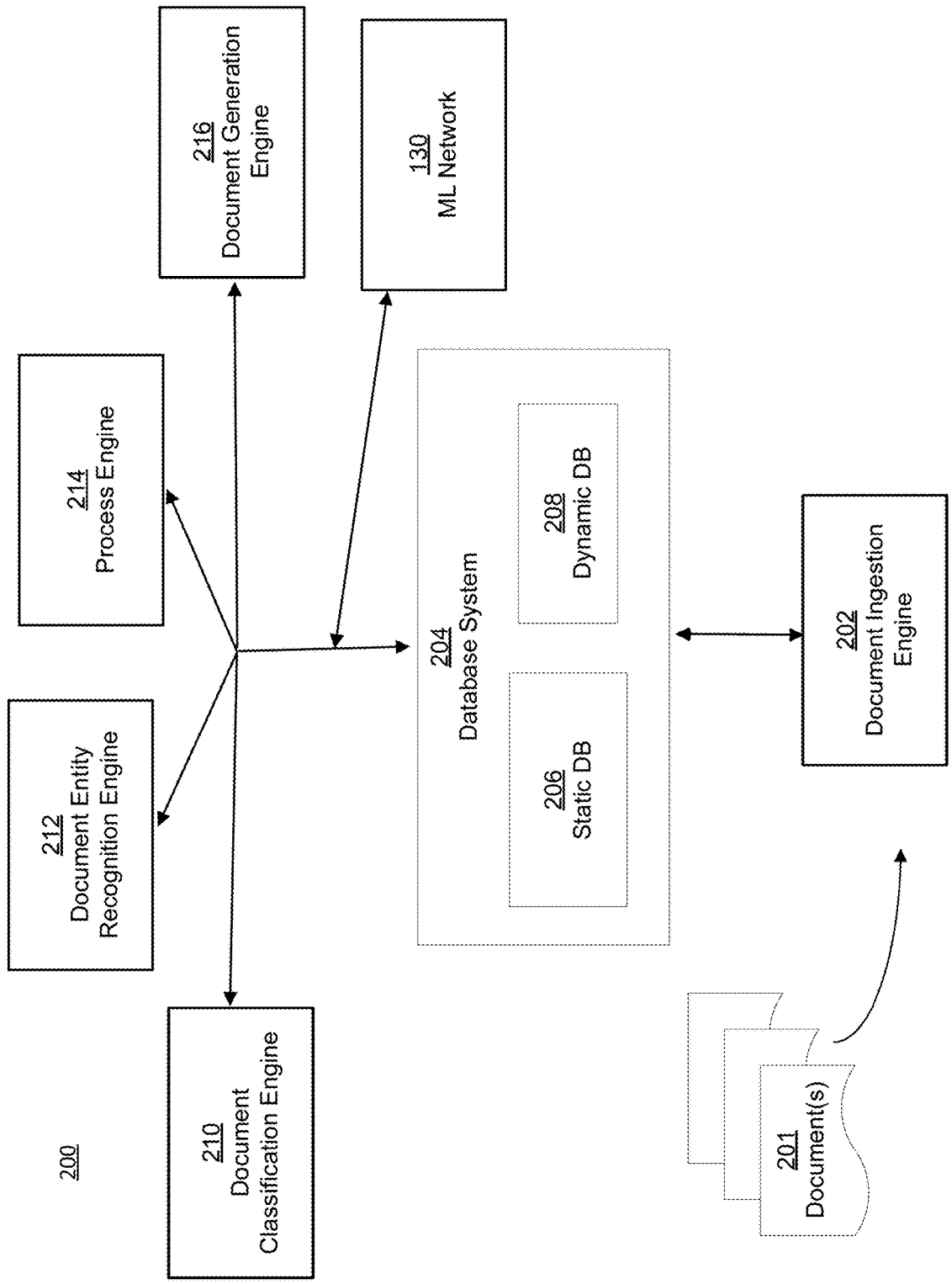
FIG. 2 is a diagram illustrating an exemplary environment in which some embodiments may operate.
Figure 3:
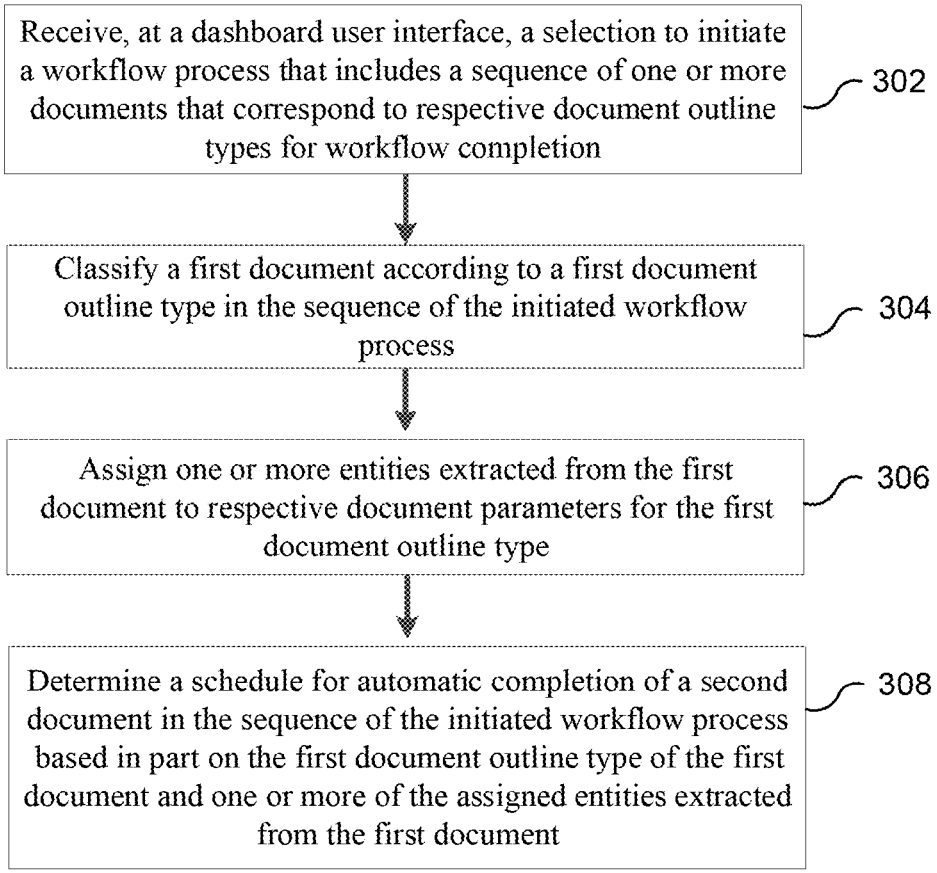
FIG. 3 is a diagram illustrating an exemplary method that may be performed in some embodiments.

The document ingestion module 106 of the system 100 may perform functionality illustrated in FIGS. 2 and 3.

The document classification module 108 of the system 100 may perform functionality illustrated in FIGS. 2, 3, 4, 5A, 5B, 5C, 6A and 6B.

The named entity recognition module 110 of the system 100 may perform functionality as illustrated in FIGS. 2, 3, 4, 5A, 5B, 5C, 6A and 6B.

The process engine module 112 of the system 100 may perform functionality as illustrated in FIGS. 2, 3, 5A, 5B, 5C, 6A and 6B.

The document generation module 114 of the system 100 may perform functionality as illustrated in FIGS. 2, 3, 5A, 5B, 5C, 6A and 6B.

The machine learning module 116 of the system 100 may perform functionality as illustrated in FIGS. 2, 3, 5A, 5B, 5C, 6A and 6B.

The user interface module 118 of the system 100 may display information based on functionality as illustrated in FIGS. 2, 3, 5A, 5B, 5C, 6A and 6B.

While the databases 120, 122 and 124 are displayed separately, the databases and information maintained in a database may be combined together or further separated in a manner that promotes retrieval and storage efficiency and/or data security.

As shown in diagram 200 of an Automation Platform in FIG. 2, one or more documents 201 may be input into a document ingestion engine 202. For example, the documents 201 may be documents of any format (.doc, .pdf, email, etc.) that are stored in a memory associated with an organization, such as a particular corporation. A corporation may be viewed as a nexus of various types of contracts. By understanding the contracts to which the corporation is a party, one may understand the obligations, duties and actions undertaken by the corporation. Various embodiments herein are directed to automation of manual work involved in the corporate operations based on information gathered from corporate documents. As such, corporate documents, including various contracts, are viewed as a Single Source of Truth (SSoT). The documents 201 may further be filtered to be associated with a set list of corporate personnel. For example, a requirement may be that any input documents 201 must have been emailed to, drafted by, or sent by any corporate executive at a particular level of management responsibility. The database system 204 stores static data in a static database 120 and dynamic data in a dynamic database 122. According to various embodiments, extracted document data may be stored in the dynamic database 122 and various defined document outlines, templates, schemas and one or more defined document parameters may be stored in the static database 120. According to various embodiments, component model data may be stored in the dynamic database 122.

According to various embodiments, the document classification engine 210 applies one or more machine learning techniques via the machine learning network 130 to the input document(s) 201 in order to classify the input documents 201 according to a document outline type(s) stored in the static database 120. The named entity recognition engine 212 applies one or more machine learning techniques via the machine learning network 130 to one or more portions of text extracted from the input documents. For example, the extracted text may be stored in the dynamic database 122 as named entities. The document classification engine 210 identifies respective parameters that correspond to the document outline type that represents the classification of the input document(s) 201. According to various embodiments, text extraction can occur at the document ingestion engine 202, the document classification engine 210 and/or the named entity recognition engine 212. According to various embodiments, identification of one or more named entities in raw text of a document(s) may be performed according to various natural language processing algorithms. According to various embodiments, one or more documents may be based, at least in part, on various types of corporate documents, such as contract types, legal documents, regulatory compliance documents, agreements, financial documents and/or invoices.

According to various embodiments, the process engine 214 builds a knowledge graph that links various types of defined document outlines (or templates, etc.) as belonging to a particular workflow (such as a corporate process) that requires the distribution and completion of various documents according to a particular sequence and/or interval. For example, in a particular sequence, one or more various tasks need to be initiated and completed via the exchange and signature of a first document type before exchange and signature of a second document type is required. However, completion of both documents is necessary in order to fully complete the particular workflow. It is understood that one or more workflow processes are not limited to a sequence that requires use of only two types of documents. A workflow process may involve any number of different types of documents and there may be any number of distinct, differing workflow processes. In addition, various workflow processes may be initiated to be automatically completed concurrently.

According to various embodiments, an end user may select to initiate a process via the process engine 214 to obtain, for example, a city business license that requires completion of a sequence of a plurality of tasks. The process engine 214 may monitor one or more organization computer systems to detect when the city license document(s) is received. The city license document may be sent through postal mail and may be scanned upon receipt in order to be ingested via the document ingestion engine 202 into the process engine 214. The process engine 214 detects the scanned and ingested city license document.

The Automation Platform implements a machine learning algorithm(s) via the document classification engine 210 in order to classify the scanned and ingested city business license document according to a document outline type. The Automation Platform further implements machine learning algorithm(s) via the named entity recognition engine 212 to extract text from the city business license document as one or more named entities to predict mappings to one or more parameters that correspond to the document outline type classification of the city business license document. In addition, the Automation Platform trains the machine learning algorithm(s) based at least in part on predicted and/or verified document outline types and corresponding document parameters.

The Automation Platform implements a confidence threshold algorithm(s) to determine a confidence level regarding the document outline type that has been selected for the ingested city business license document and/or a confidence level regarding the probability of one or more mappings between named entities and required parameters. If the confidence level(s) does not meet a confidence threshold, the Automation Platform may trigger display of a review user interface. The review user interface provides an end user with functionality to correct predicted mappings the named entity recognition engine 212 calculated for extracted named entities and the document outline type's parameters. The end user may input one or more corrections and submit the corrected entity-to-parameter mappings back into the Automation Platform.

The process engine 214 of the Automation Platform scans the ingested city business license document's document outline type classification and the reviewed and submitted named entity-to-parameter mappings. The process engine 214 may schedule the initiation and required completion dates of various tasks within the city business license workflow process. The document outline type may include a parameter for renewal of the city license and a mapped named entity from the business license (that was approved by the end user via the review user interface) may provide a date value for the city license renewal parameter. The process engine 214 accesses a knowledge graph that includes a relationship between the city license renewal parameter and a corresponding task for renewing the city business license. The license renewal task may itself require the completion of different documents.

The process engine 214 calculates a start date for the license renewal task based on the date value of the named entity that mapped to the city license renewal parameter and calculates a due date for when the license renewal task will be completed. When the start date arrives, the process engine 214 automatically triggers initiation of the license renewal task and the Document Generation Engine 216 may generate one or more required documents for the license renewal task. The process engine 214 may complete and send the required documents to one or more external recipients.

As shown in flowchart 300 of FIG. 3, at step 302, the Automation Platform receives, at a dashboard user interface, a selection to initiate a workflow process that includes a sequence of one or more documents that each may correspond to a different document outline type required for workflow completion.

At step 304, the Automation Platform classifies a first document according to a first document outline type in the sequence of the initiated workflow process. The first document may be received from an external source or may be generated from within the Automation Platform. According to various embodiments, the Automation Platform implements a machine learning algorithm(s) to generate one or more term frequency-inverse document frequency ("TFIDF") matrices based on the first document and performs a comparison between respective K-means clusters of the TFIDF matrices of the first document and one or more defined document outline types. Based on the comparison, the Automation Platform identifies a matching defined document outline type. The Automation Platform classifies the first document according to the matching defined document outline type.

According to various embodiments, the static datastore includes predefined document outline types and/or templates and corresponding defined parameters and/or data types. Any element stored in the static datastore may be predefined by a software developer. In one embodiment, a document outline type may be based on text and document attributes present in previously received and ingested documents.

At step 306, the Automation Platform assigns (i.e. maps) one or more entities extracted from the first document to respective document parameters for the first document outline type. The Automation Platform may implement a natural language processing machine learning algorithm(s) to extract one or more named entities from a document and generate predicted mappings between the one or more named entities and the respective defined parameters that correspond with the first document outline type. Upon determining a confidence threshold with respect to one or more mapped entities has not been satisfied, the Automation Platform displays a review user interface. The Automation Platform receives, at the review user interface, a selection of a correction of one or more of the predicted mappings between entities and respective defined parameters.

For example, each document outline and/or template may have various associated parameters in the static datastore. A parameter is a type of term expected in a particular instance of a type of regularly used document. For example, a "job offer" document outline type may have a "base salary" parameter and a "stock options grant" parameter. As such, an ingested job offer letter may have an extracted named entity that corresponds to text representing an annual salary that the Automation Platform predicts should be mapped to the "base salary" parameter and another named entity that corresponds to text for a particular number of stock options that the Automation Platform predicts should be mapped to the "stock options grant" parameter.

At step 308, the Automation Platform determines a schedule for automatic completion of a second document in the sequence of the initiated workflow process based in part on the first document outline type of the first document and one or more of the assigned entities extracted from the first document. The Automation Platform may trigger generation of the second document according to a second document outline type. The Automation Platform may access a knowledge graph describing a task sequence of one or more tasks associated with the second document outline type and send the second document to one or more recipients for completion of a respective task in the task sequence. For example, the Automation Platform triggers generation of the second document based on a completion status of the first document and/or one or more values of entities extracted from the first document mapping to respective defined parameters that correspond with the first document outline type.

According to various embodiments, the Automation Platform may implement a "machine learning with human-in-the-loop"-based approach to gradually rely more on machine learning to detect and classify document outlines, templates, parameters and/or data types included in the static datastore. For example, TFIDF matrices of a document(s) may be generated and the Automation Platform may compare the K-means cluster of the TFIDF matrices to find similar documents outline types in the static datastore. For the "human-in-the-loop" portion after document classification and entity recognition, an end-user may access a review user interface to correct and/or validate the classification of the document's outline type and predicted entity mappings. The Automation Platform may update the machine learning training data according to approved validated and corrected mappings submitted by the end-user during the "human-in-the-loop" portion. The Automation Platform may thereby perform one or more iterations of machine learning training based on the training data.

Figure 4:
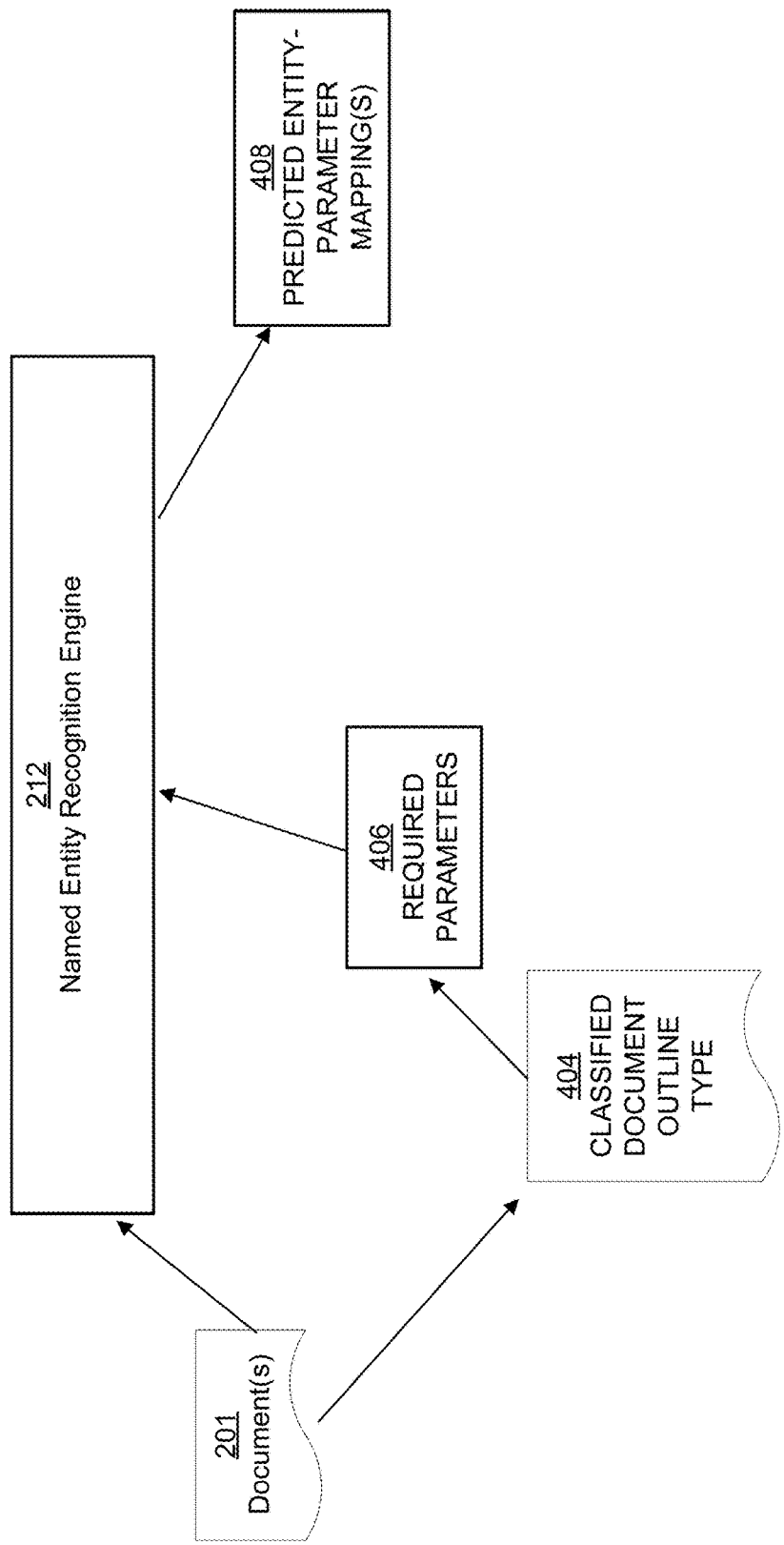
FIG. 4 is a diagram illustrating an exemplary method that may be performed in some embodiments.

As shown in diagram 400 of FIG. 4, the named entity recognition engine 212 ("NER Engine") receives a scanned document(s) 201 and converts the scanned document to raw text. The scanned document may be classified by the document classification engine 210 according to a particular document outline type that has one or more required parameters. The NER Engine 212 applies natural language processing to the raw text to extract one or more named entities. The NER Engine 212 maps the extracted named entities to the one or more required parameters of a document outline type that is a classification of the scanned document. According to various embodiments, NER Engine 212 accesses a data model(s) to predict a mapping between an extracted named entity and a required parameter of the document outline type that is the classification of the scanned document. For a given named entity, the NER Engine 212 calculates a probability of whether there should be a mapping between the given named entity and a required parameter.

Figure 5A:
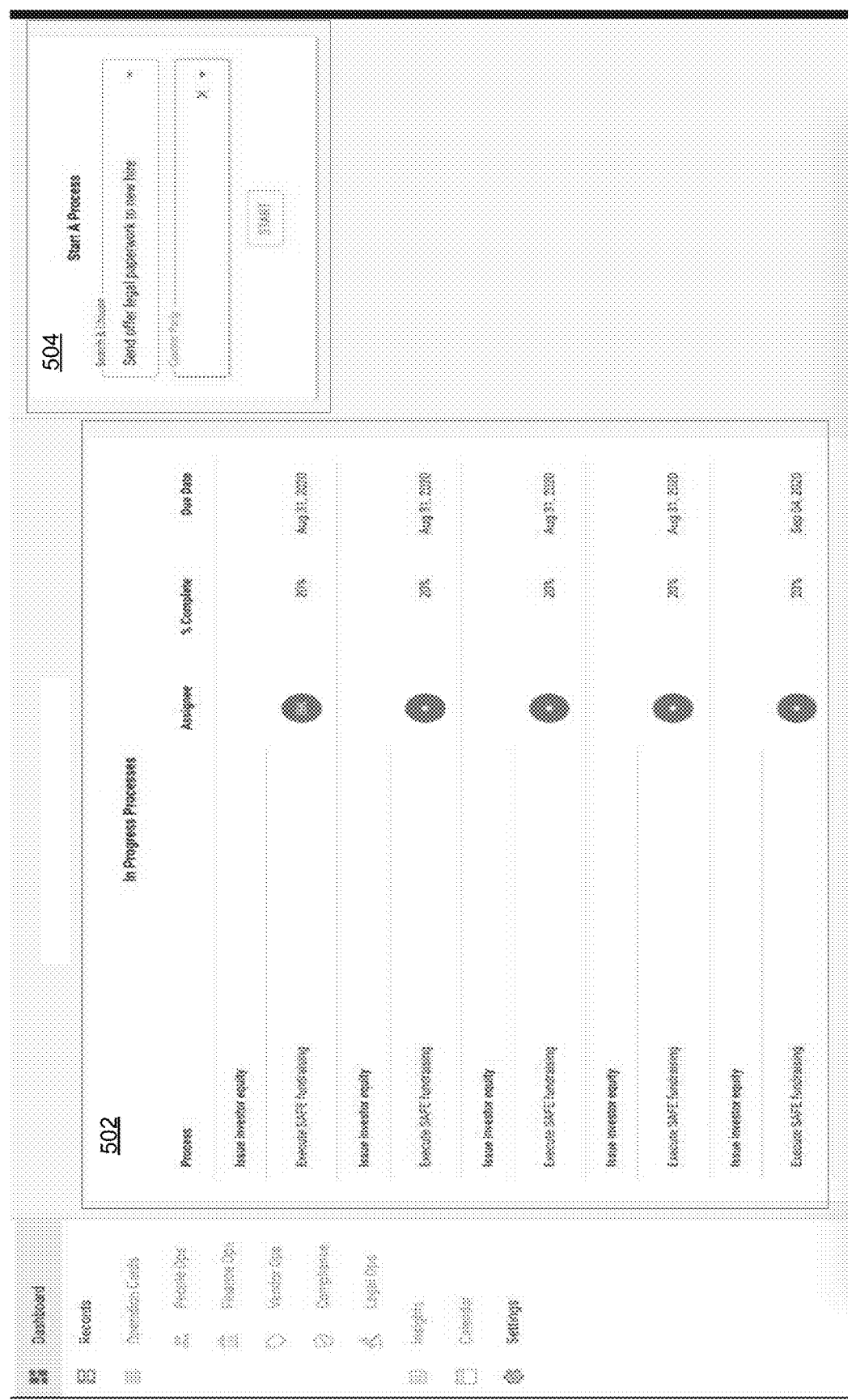
FIGS. 5A, 5B and 5C each illustrate a diagram of an exemplary user interface according to one or more embodiments.

As shown in diagram 500 of a dashboard user interface of FIG. 5A, a listing of one or more processes currently in progress may be displayed in a first panel 502 of the interface 500. A start panel 504 provides an end-user with functionality from the Process Engine 214 to select and initiate a process that includes a sequence of tasks where each task may require the use and completion of different types of documents. For example, an end-user may select at the start panel 504 a process for sending one or more required legal documents to an individual in connection with extending an offer of employment to that individual.

Figure 5B:
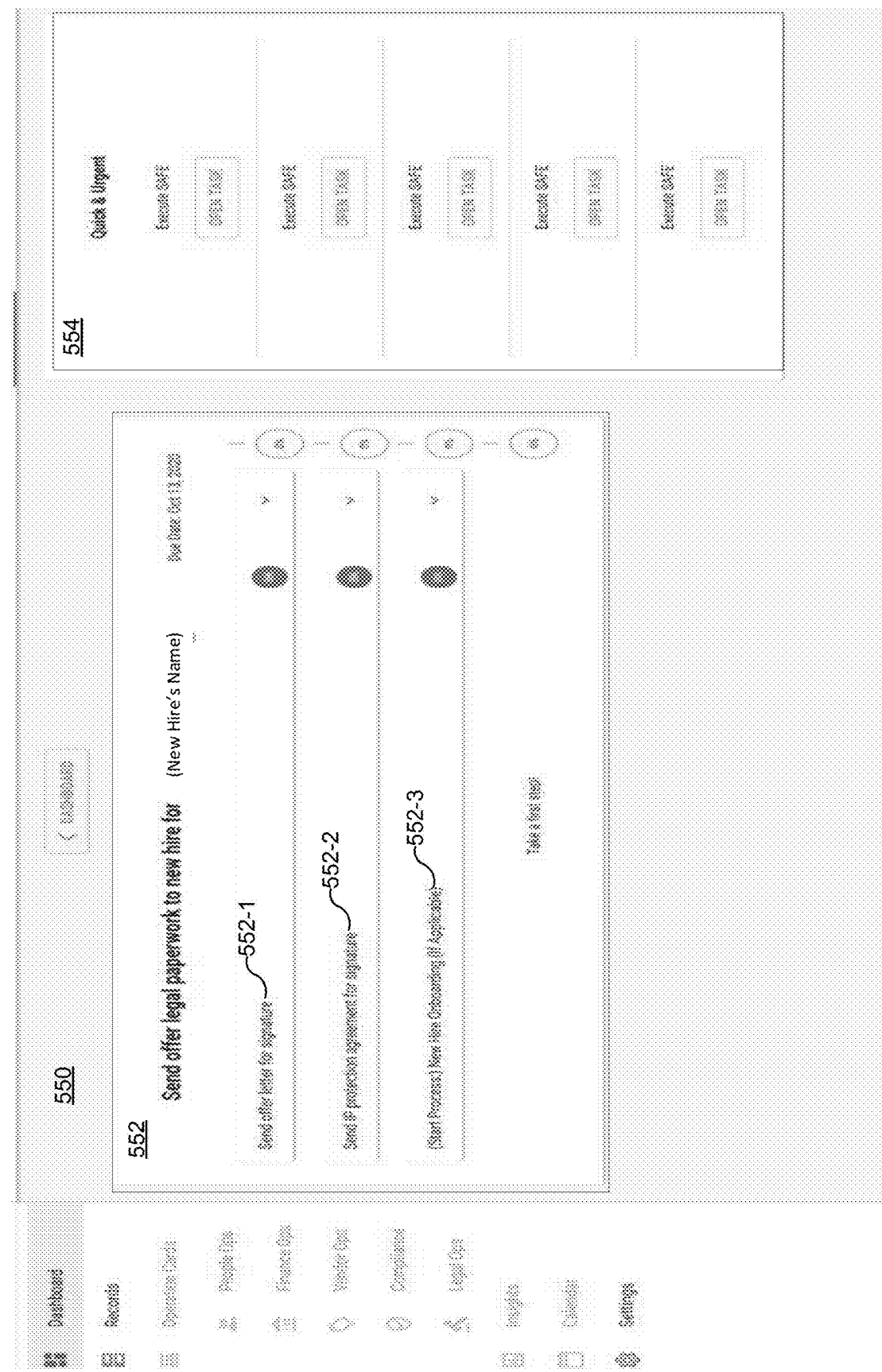
Figure 5C:
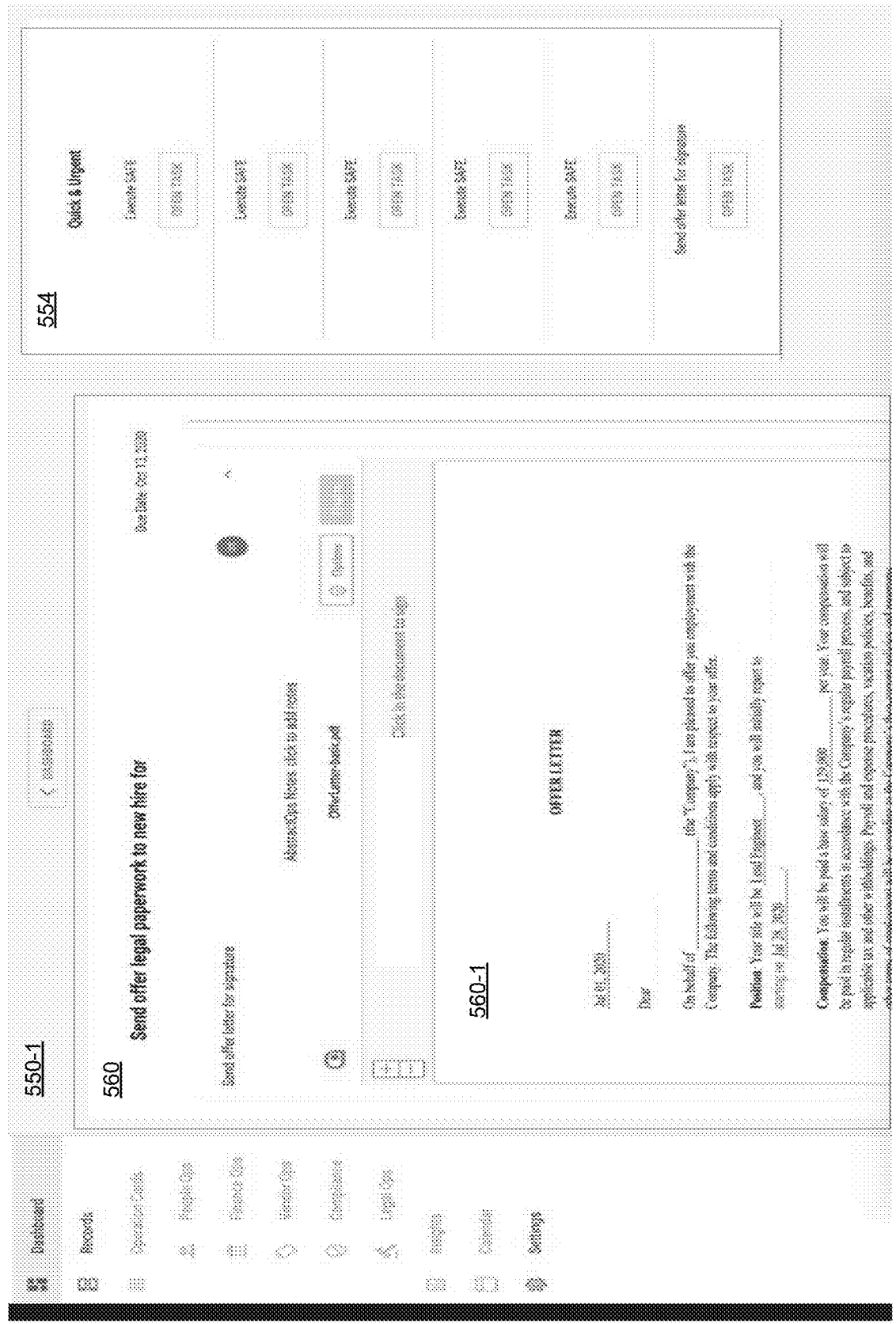

As shown in diagram 550 of a dashboard user interface of FIG. 5B, a process panel 552 displays a sequence of tasks 552-1, 552-2, 552-3 required to be completed in order to fully complete the selected process. Each task 552-1, 552-2, 552-3 may require different document(s) to be sent to one or more recipients for signature and approval. As shown in diagram 550-1 of a dashboard user interface of FIG. 5C, a document panel 560 for a first task 552-1 may display an editable version of a document(s) 560-1 generated by the Document Generation Engine 216 required for completing the first task 552-1. The end-user may add text directly to the document 560-1 and select functionality for the edited version of the document 560-1 to be sent to one or more recipients.

Figure 6A:
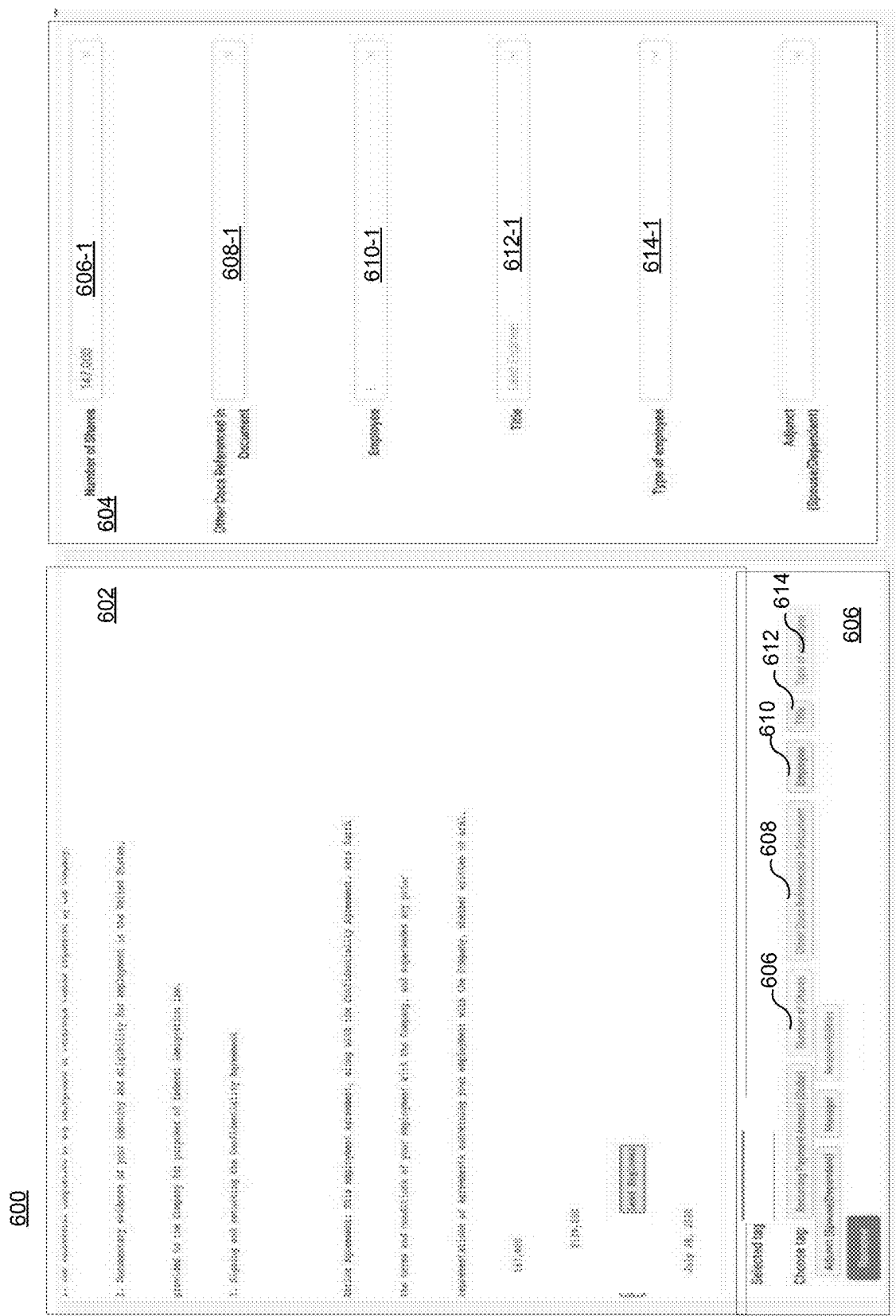
FIGS. 6A and 6B each illustrate a diagram of an exemplary user interface according to one or more embodiments.

As shown in diagram 600 of a human-review user interface of FIG. 6A, the Automation Platform may classify a document according to a particular document outline type 602. The Automation Platform ingests the new hire offer letter at the Document Ingestion Engine 202 and analyzes the letter via the Document Classification Engine 210 and the Document Entity Recognition Engine 212. For example, the particular document outline type 602 may define the structure and text of a new hire offer letter for employment. The particular document outline type 602 may have one or more pre-defined parameters 606, 608, 610, 612, 614 which describe the type of relevant information that is located in the text of the particular document outline type 602. The interface 600 includes a review panel 604 in which an end-user acting as a human reviewer may correct one or more text input fields 606-1, 608-1, 610-1, 612-1, 614-1 that correspond to predicted mappings between extracted named entities from the new hire offer letter and the parameters 606, 608, 610, 612, 614. For example, if the Automation Platform incorrectly mapped a named entity for a value of a "Number of Shares" parameter 606 indicated from the new hire offer letter, the end user may access the review panel 604 and directly input a correct value of "147,00" that should be mapped to the "Number of Shares" parameter 606. According to another example, if the Automation Platform incorrectly mapped an entity for a value of a "Title" parameter 612 indicated from the new hire offer letter, the end user may access the review panel 604 and directly input a correct value of "Lead Engineer" that should be matched to the "Title" parameter 612.

Figure 6B:
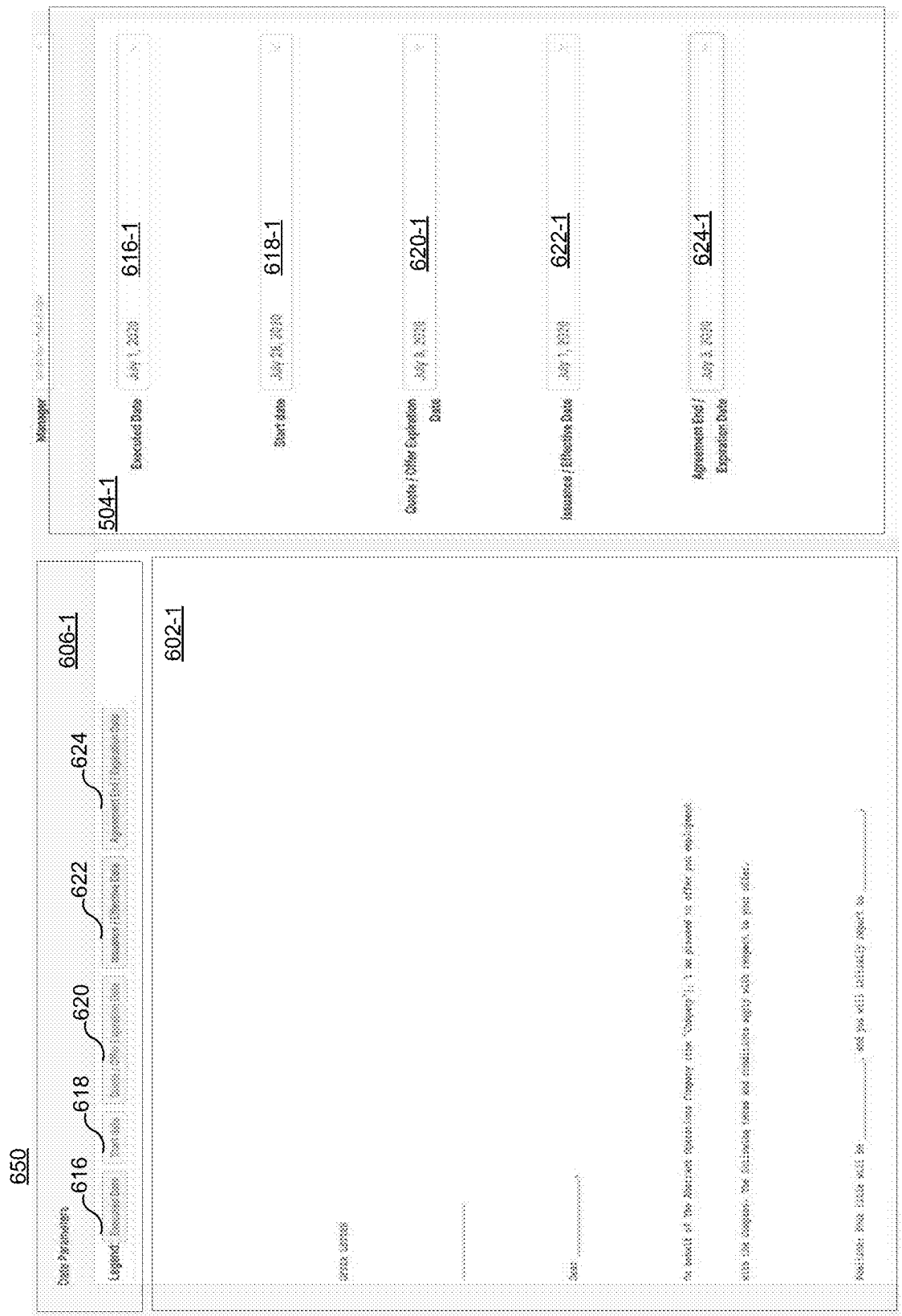

An additional portion 602-1 of the new hire offer letter is displayed in diagram 650 of a human-review user interface of FIG. 6B. For example, the portion 602-1 of the new hire offer letter for employment corresponds to one or more predefined parameters 616, 618, 620, 622, 624 of the particular document outline type 602, which describe the type of relevant information that is located in the text of the particular document outline type 602. The interface 650 includes an updated review panel 604-1 in which the end-user may correct one or more text input fields 616-1, 618-1, 620-1, 622-1, 624-1 that correspond to predicted mappings between extracted named entities from the new hire offer letter and the parameters 616, 618, 620, 622, 624. For example, if the Automation Platform incorrectly mapped a named entity to an "Executed Date" parameter 616 indicated from the new hire offer letter, the end user may access the review panel 604-1 and directly input a correct value of "Jul. 1, 2020" that should be mapped to the "Executed Date" parameter 616. According to another example, if the Automation Platform incorrectly mapped a named entity to a "Start Date" parameter 618 indicated from the new hire offer letter, the end user may access the review panel 604-1 and directly input a correct value of "Jul. 28, 2020" that should be mapped to the "Start Date" parameter 618.

According to various embodiments, the Automation Platform may ingest and analyze a received document that was not initially sent from the Automation Platform with respect to a selected process. The Automation Platform ingests the received document and analyzes the received document via the Document Classification Engine 210 and the Document Entity Recognition Engine 212 in order to classify the received document as a document outline type required for completing a specific task in a process that is currently in progress. Upon classification, the Automation Platform may select a corresponding document outline type with one or more parameters and display the interfaces of FIG. 6A, 6B, 6C accordingly.

Figure 7:
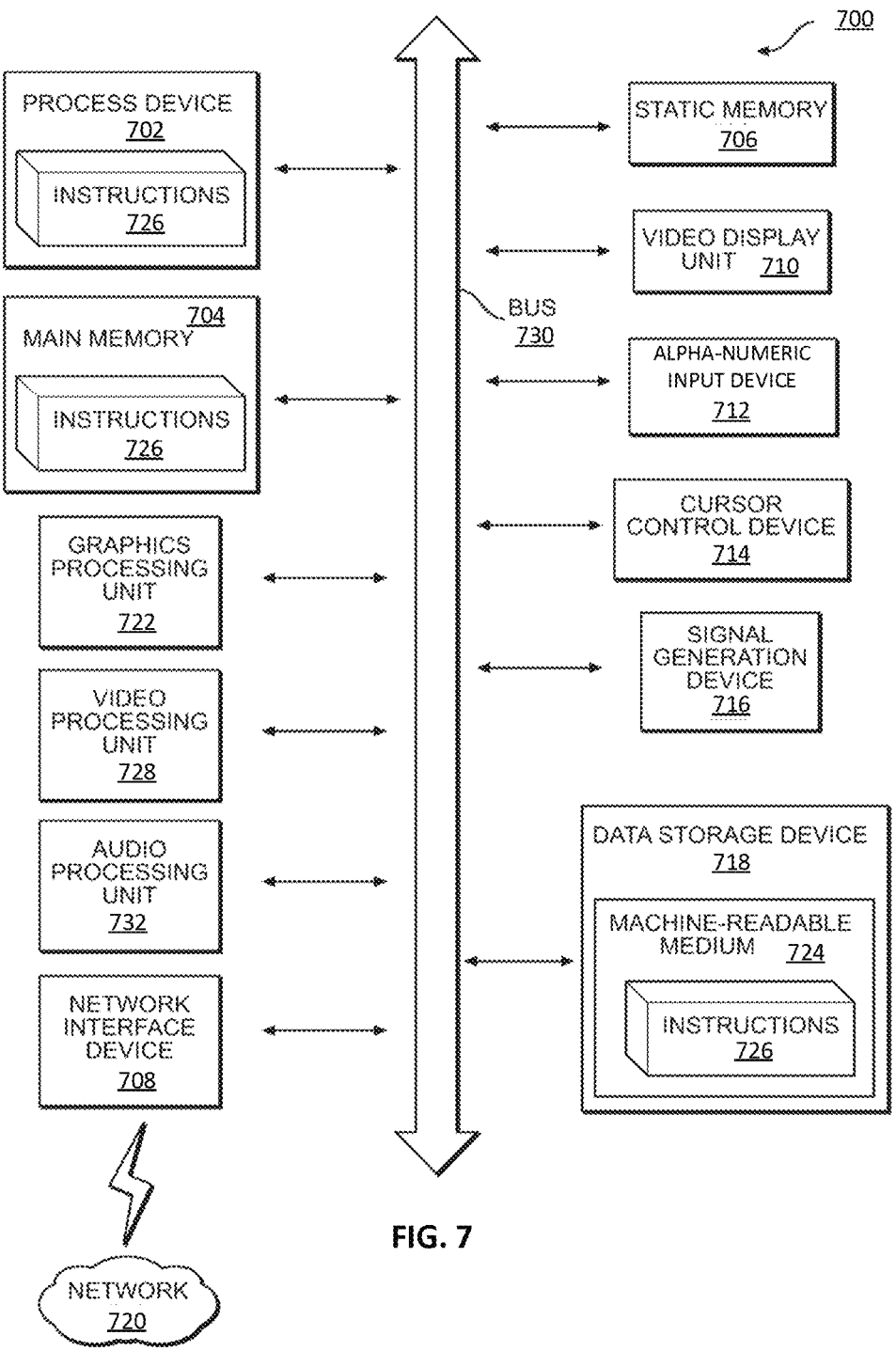
FIG. 7 is a diagram illustrating an exemplary environment in which some embodiments may operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:
   receiving, at a dashboard user interface, a selection to initiate a workflow process that includes a sequence of one or more documents that correspond to respective document outline types for workflow completion;
   classifying a first document according to a first document outline type in the sequence of the initiated workflow process;
   assigning one or more named entities extracted from the first document to respective document parameters for the first document outline type;
   identifying one or more portions of document content in the first document as respective values for the one or more named entities assigned to the respective document parameters for the first document outline type; and
   determining a schedule for automatic completion of a second document in the sequence of the initiated workflow process based in part on the first document outline type of the first document and one or more of the respective values of the of the assigned named entities
   wherein determining the schedule for automatic completion further comprises:
      triggering generation of the second document based at least in part on a value of a particular named entity extracted from the first document, the second document generated according to a second document outline type;
      accessing a knowledge graph describing a task sequence of one or more tasks associated with the second document outline type; and
      sending the second document to one or more recipients for completion of a respective task in the task sequence.

2. The computer-implemented method of claim 1, wherein classifying a first document according to a first document outline type in the sequence of the initiated workflow process comprises:
   generating one or more TFIDF matrices based on the first document and performing a comparison between respective K-means clusters of the TFIDF matrices and one or more defined document outline types; and
   identifying a matching defined document outline type based on the comparison.

3. The computer-implemented method of claim 1, wherein assigning one or more named entities extracted from the first document to respective document parameters comprises:
   predicting respective mappings between one or more extracted named entities and defined parameters that correspond with the first document outline type; and displaying a review user interface upon determining a confidence threshold with respect to one or more of the mappings has not been satisfied.

4. The computer-implemented method of claim 3, further comprising:
receiving, at the review user interface, a selection of a correction of one or more of the mapped named entities and respective defined parameters.

5. The computer-implemented method of claim 1, wherein triggering generation of the second document based on a completion status of the first document.

6. The computer-implemented method of claim 1, wherein classifying a first document comprises:
implementing one or more machine learning techniques to predict one or more document outline types and respective document outline parameters associated with the first document.

7. A system comprising one or more processors, and a non-transitory computer-readable medium including one or more sequences of instructions that, when executed by the one or more processors, cause the system to perform operations comprising:
receiving, at a dashboard user interface, a selection to initiate a workflow process that includes a sequence of one or more documents that correspond to respective document outline types for workflow completion;
classifying a first document according to a first document outline type in the sequence of the initiated workflow process;
assigning one or more named entities extracted from the first document to respective document parameters for the first document outline type;
identifying one or more portions of document content in the first document as respective values for the one or more named entities assigned to the respective document parameters for the first document outline type; and
determining a schedule for automatic completion of a second document in the sequence of the initiated workflow process based in part on the first document outline type of the first document and one or more of the respective values of the of the assigned named entities;
wherein determining the schedule for automatic completion further comprises:
triggering generation of the second document based at least in part on a value of a particular named entity extracted from the first document, the second document generated according to a second document outline type;
accessing a knowledge graph describing a task sequence of one or more tasks associated with the second document outline type; and
sending the second document to one or more recipients for completion of a respective task in the task sequence.

8. The system of claim 7, wherein classifying a first document according to a first document outline type in the sequence of the initiated workflow process comprises:
generating one or more TFIDF matrices based on the first document and performing a comparison between respective K-means clusters of the TFIDF matrices and one or more defined document outline types; and
identifying a matching defined document outline type based on the comparison.

9. The system of claim 7, wherein assigning one or more named entities extracted from the first document to respective document parameters comprises:
predicting respective mappings between one or more extracted named entities and defined parameters that correspond with the first document outline type; and
displaying a review user interface upon determining a confidence threshold with respect to one or more of the mappings has not been satisfied.

10. The system of claim 9, further comprising:
receiving, at the review user interface, a selection of a correction of one or more of the mapped named entities and respective defined parameters.

11. The system of claim 7, wherein triggering generation of the second document based on a completion status of the first document.

12. The system of claim 7, wherein classifying a first document comprises:
implementing one or more machine learning techniques to predict one or more document outline types and respective document outline parameters associated with the first document.

13. A computer program product comprising a non-transitory computer-readable medium having a computer-readable program code embodied therein to be executed by one or more processors, the program code including instructions to:
receiving, at a dashboard user interface, a selection to initiate a workflow process that includes a sequence of one or more documents that correspond to respective document outline types for workflow completion, wherein receiving the selection comprises: receiving a selection to initiate a workflow process for completion of a task;
classifying a first document according to a first document outline type in the sequence of the initiated workflow process, wherein classifying the first document comprises: classifying an externally generated document from a remote source according to the first document outline type;
assigning one or more named entities extracted from the first document to respective document parameters for the first document outline type;
identifying one or more portions of document content in the first document as respective values for the one or more named entities assigned to the respective document parameters for the first document outline type;
wherein identifying one or more portions of document content further comprises: identifying a task start date value in a particular portion of the document content as a value of a particular named entity extracted from the first document; and
determining a schedule for automatic completion of a second document in the sequence of the initiated workflow process based in part on the first document outline type of the first document and the task start date value;
wherein determining the schedule for automatic completion further comprises:
triggering generation of the second document based at least in part on the task start date value, the second document generated according to a second document outline type;
accessing a knowledge graph describing a task sequence of one or more tasks associated with the second document outline type; and sending the second document to one or more recipients for completion of a respective task in the task sequence.

14. The computer program product of claim 13, wherein classifying a first document according to a first document outline type in the sequence of the initiated workflow process comprises:
generating one or more TFIDF matrices based on the first document and performing a comparison between respective K-means clusters of the TFIDF matrices and one or more defined document outline types; and
identifying a matching defined document outline type based on the comparison.

15. The computer program product of claim 13, wherein assigning one or more named entities extracted from the first document to respective document parameters comprises:
predicting respective mappings between one or more extracted named entities and defined parameters that correspond with the first document outline type; and
displaying a review user interface upon determining a confidence threshold with respect to one or more of the mappings has not been satisfied; and
receiving, at the review user interface, a selection of a correction of one or more of the mapped named entities and respective defined parameters.

16. The computer program product of claim 13, wherein triggering generation of the second document based on a completion status of the first document; and
wherein classifying a first document comprises:
implementing one or more machine learning techniques to predict one or more document outline types and respective document outline parameters associated with the first document.

17. The computer-implemented method of claim 1, further comprising:
wherein receiving a selection to initiate a workflow process comprises:
receiving a selection to initiate a workflow process for completion of a task;
wherein classifying a first document comprises:
classifying an externally generated document from a remote source according to the first document outline type;
wherein identifying one or more portions of document content in the first document as respective values for the one or more named entities comprises:
identifying a task start date value in a particular portion of the document content as a value of a particular named entity extracted from the first document; and
wherein determining a schedule for automatic completion of a second document in the sequence of the initiated workflow process comprises:
determining the schedule based at least on the task start date value for automatic completion of the second document in a sequence of the initiated workflow for completion of the task.

* * * * *